United States Patent [19]

Schilling

[11] Patent Number: 5,179,572
[45] Date of Patent: Jan. 12, 1993

[54] SPREAD SPECTRUM CONFERENCE CALLING SYSTEM AND METHOD

[75] Inventor: Donald L. Schilling, Sands Point, N.Y.

[73] Assignee: SCS Mobilecom, Inc., Port Washington, N.Y.

[21] Appl. No.: 715,835

[22] Filed: Jun. 17, 1991

[51] Int. Cl.[5] ............................................ H04L 27/30
[52] U.S. Cl. ...................................................... 375/1
[58] Field of Search ............................................ 375/1

[56] References Cited

U.S. PATENT DOCUMENTS

| | | | |
|---|---|---|---|
| 4,425,642 | 1/1984 | Moses et al. | 375/1 |
| 4,494,238 | 1/1985 | Groth, Jr. | 375/1 |
| 4,942,591 | 7/1990 | Nease et al. | 375/1 |
| 5,022,046 | 6/1991 | Morrow, Jr. | 375/1 |
| 5,031,173 | 7/1991 | Short et al. | 375/1 |

Primary Examiner—Salvatore Cangialosi
Attorney, Agent, or Firm—David Newman & Associates

[57] ABSTRACT

A spread-spectrum-conference-calling receiver, for use over a communications channel. At each of a plurality of spread-spectrum transmitters, a transmitter-generic-chip-code generator generates a generic-chip-code signal and a transmitter-message-chip-code generator generates a message-chip-code signal. An EXCLUSIVE-OR gate spread-spectrum processes message data with the message-chip-code signal to generate a spread-spectrum signal. The combiner combines the generic-chip-code signal and the spread-spectrum-processed signal. A plurality of receiver-generic-chip-code generators generate a plurality of replicas of the generic-chip-code signal. Each receiver-generic mixer recovers a carrier signal from one of the plurality of received spread-spectrum-communications signals. A plurality of receiver-message-chip-code generators generate a plurality of replica of the message-chip-code signals. A plurality of receiver-message mixers despread one of the plurality of received spread-spectrum-communications signal as a modulated-data signal. Tracking and acquistion circuits use the recovered carrier signal for synchronizing the replicas of the generic-chip-code signals to the recovered carrier signals, respectively. An envelope detector demodulates the modulated-data signal as a demodulated signal.

15 Claims, 5 Drawing Sheets

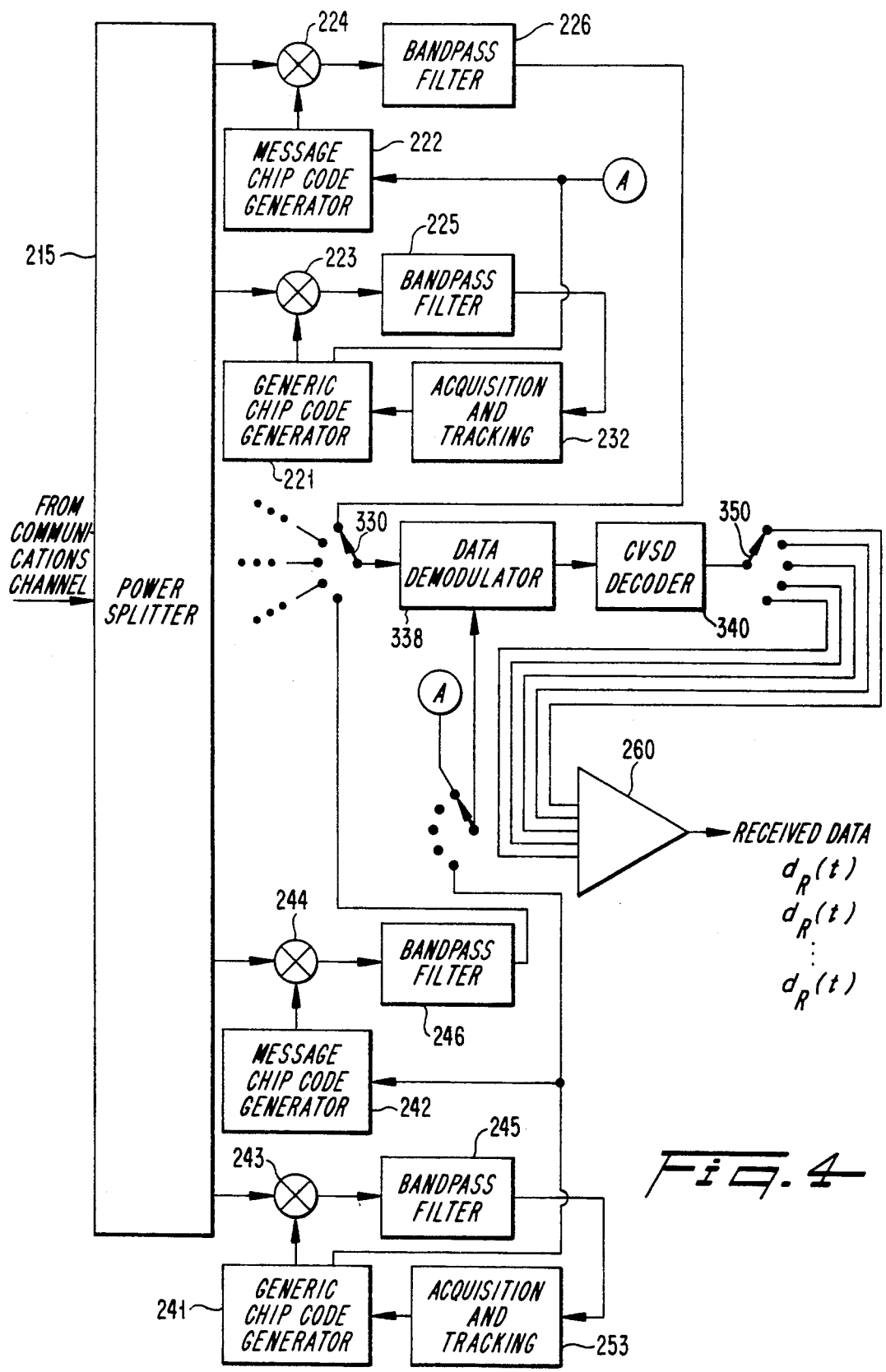

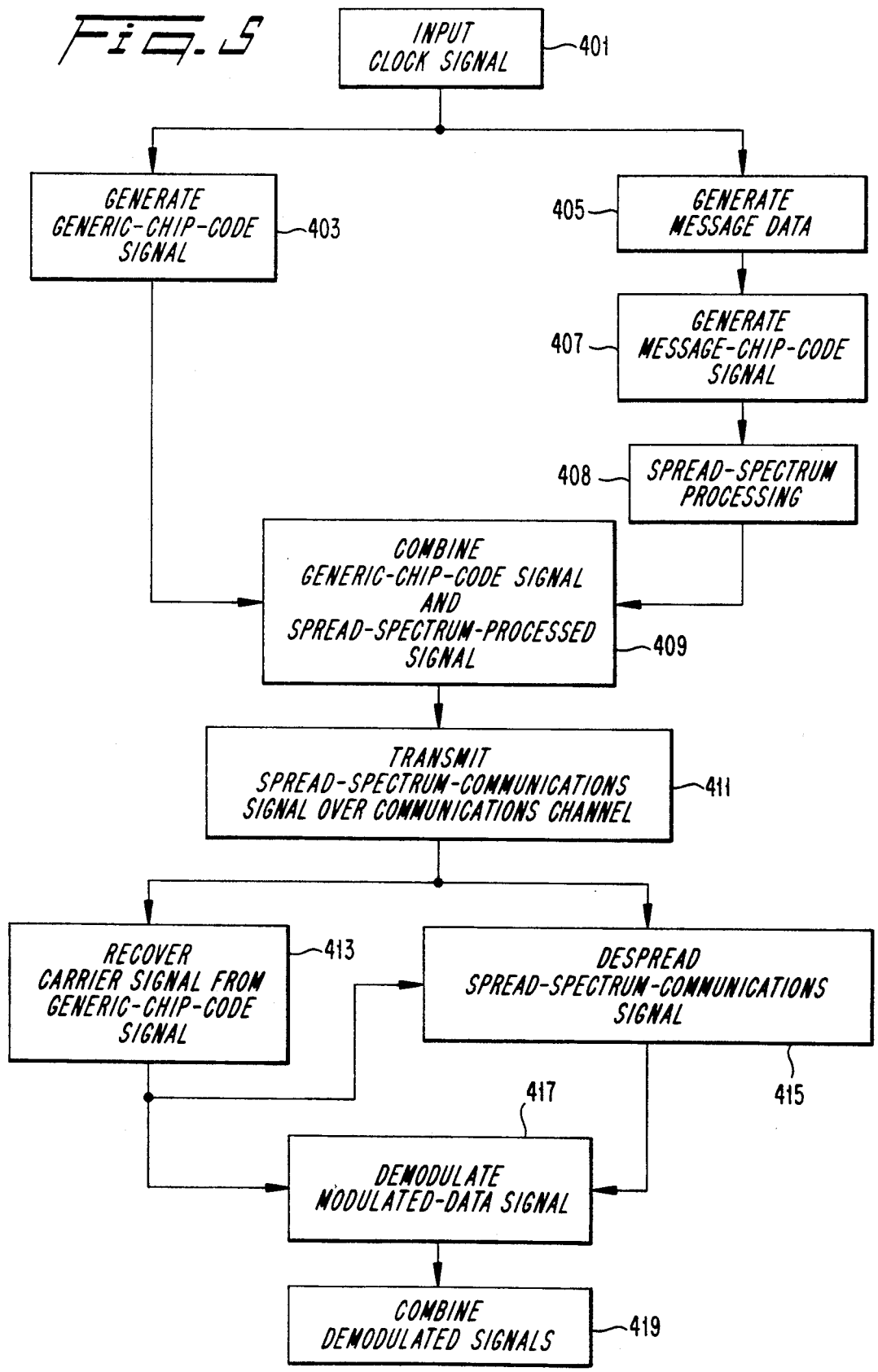

SPREAD SPECTRUM CONFERENCE CALLING SYSTEM AND METHOD

BACKGROUND OF THE INVENTION

This invention relates to spread-spectrum communications and more particularly to a system and method for conference calling with a multiplicity of spread-spectrum signals.

DESCRIPTION OF THE PRIOR ART

Referring to FIG. 1, message data, d(t), are processed by spread-spectrum data modulator 51, using a message chip code signal, $g_1(t)$, to generate a spread-spectrum data signal. The spread-spectrum data signal is processed by transmitter 52 using a carrier signal at a carrier frequency, $f_0$, and transmitted over communications channel 53.

At a receiver, a spread-spectrum demodulator 54 despreads the received spread-spectrum signal, and the message data are recovered by synchronous data demodulator 60 as received-message data. The synchronous data demodulator 60 uses a reference signal for synchronously demodulating the despread spread-spectrum signal. The square-law device 55, bandpass filter 56 and frequency divider 57 are well known in the art for generating a reference signal from a received modulated data signal. A Costas Loop or other reference signal generating circuit is also adequate.

The spread-spectrum system of FIG. 1 is limited to a single communications channel, and would not work well for receiving a multiplicity of spread-spectrum signals in a fading environment. In a conference calling situation, where a plurality of uses desire to speak to each other, there is a need for an economical method and apparatus for implementing such a system.

Additionally, in a fading channel, such as the ionosphere, a city or any channel containing multipath, or more generally, any channel in which the received signal's amplitude fluctuates with time, synchronous demodulation is not practical since the phase of the incoming signal typically is not the same as the phase of the reference. In such cases differential phase shift keying (DPSK) is employed. With DPSK the received signal is delayed by one symbol and multiplied by the undelayed signal. If the resulting phase is less than $\pm 90°$ a 0-bit is declared, otherwise a 1-bit is declared. Such a system is complex and suffers degradation of about 6 dB at error rates of $10^{-2}$.

Thus, a need exists for a conference calling system which works in a fading environment, and which permits communicating using spread spectrum modulation between a plurality of users.

OBJECTS OF THE INVENTION

An object of the invention is a system and method for synchronously demodulating a plurality of modulated-data signals received from a plurality of users and embedded in a received plurality of spread-spectrum-communications signals, which can serve as a conference calling receiver and which performs well whether or not the signal is fading.

Another object of the invention is synchronous, conference-calling, spread-spectrum-communications system.

SUMMARY OF THE INVENTION

According to the present invention, as embodied and broadly described herein, a spread spectrum communications system for use over a communications channel is provided comprising a plurality of spread-spectrum transmitters and a spread-spectrum-conference calling receiver. Each spread-spectrum transmitter includes generic means, message means, summer means, and transmitter means. The generic means generates a generic-chip-code signal. The message means generates a message-chip-code signal. Message data and each message-chip-code signal are synchronized to the generic-chip-code signal, or to a common clock signal. The spreading means spread-spectrum processes the message data with the message-chip-code signal to generate a spread-spectrum-processed signal. The summer means combines the generic-chip-code signal and the spread-spectrum-processed signal.

The combined signal typically is a multi-level signal, with the instantaneous-combined voltage level equal to the sum of the voltage levels of the message-chip-code signal and the generic-chip-code signal. The combined signal need not be an exact linear combination of the voltage levels. The nonlinearity does not necessarily cause a significant degradation in performance, compared with a linear sum. A multi-level signal is a signal with multiple voltage levels.

The transmitter means transmits the combined generic-chip-code signal and spread-spectrum-processed signal, on a carrier signal over the communications channel as a spread-spectrum-communications signal.

The spread-spectrum-conference-calling receiver can be used for simultaneously receiving a plurality of spread-spectrum channels of a plurality of received spread-spectrum-communications signals. The plurality of received spread-spectrum-communications signals may originate from a plurality of spread-spectrum transmitters. Each spread-spectrum transmitter sends a spread-spectrum-communications signal having message data modulated as a spread-spectrum-processed signal, and combined with a respective generic-chip-code signal.

The spread-spectrum-conference-calling receiver includes a plurality of spread-spectrum receivers and combiner means. Each spread-spectrum receiver has generic-spread-spectrum-processing means, acquisition and tracking means, message-spread-spectrum-processing means, and demodulating means.

Each of the generic-spread-spectrum processing means recovers a carrier signal from a respective spread-spectrum channel of a received spread-spectrum-communications signal, and generates a replica of the generic-chip-code signal of the spread-spectrum channel. Each of the acquisition and tracking means acquires and tracks the recovered carrier signal of the respective spread-spectrum channel. The acquisition and tracking means also synchronizes the generic-spread-spectrum-processing means to the respective recovered carrier signal.

Each of the message-spread-spectrum-processing means despreads the spread-spectrum-communications signal of the respective spread-spectrum channel as a modulated-data signal. Each detection means detects the modulated-data signal as a detected signal, respectively. The detection means may be nonsynchronous or synchronous, for converting the modulated-data signal to the detected signal, respectively.

Each bit-synchronous means uses the respective replica of the generic-chip-code signal produced by the respective generic-spread-spectrum-processing means for synchronizing the "integrating and dumping" of the detected signal. The plurality of "integrated and dumped" detected signals from the plurality of spread-spectrum receivers are referred to as a plurality of of demodulated signals from the plurality of bit-synchronous demodulated signals. The combiner means combines the plurality means, of the plurality of spread-spectrum receivers, as received-message data.

A second embodiment of the spread-spectrum-conference calling receiver for simultaneously receiving a plurality of spread-spectrum channels includes a plurality of spread-spectrum receivers, demodulation means, combiner means and switching means. Each of the plurality of spread-spectrum receivers has generic-spread-spectrum-processing means, acquisition and tracking means and message-spread-spectrum-processing means. Each of the generic-spread-spectrum-processing means generates a replica of a generic-chip-code signal. The generic-spread-spectrum-processing means uses the replica of the generic-chip-code signal for recovering a carrier signal from a respective spread-spectrum channel from one of the received spread-spectrum-communications signals. Each acquisition and tracking means acquires and tracks the recovered carrier signal, and synchronizes the generic-spread-spectrum-processing means to the recover carrier signal.

Each of the message-spread-spectrum-processing means despreads the respective spread-spectrum channel of the spread-spectrum-communications signal as a modulated-data signal. Each of the message-spread-spectrum-processing means derives synchronization from a respective replica of the generic-chip-code signal provided by the respective generic-spread-spectrum-processing means.

A single demodulating means is employed for demodulating each modulated-data signal as a respective demodulated signal. The demodulation means includes detection means and bit-synchronous means. The demodulation means is used on a time-shared basis. Accordingly, the detection means sequentially detects each of the plurality of modulation-data signals from the plurality of message-spread-spectrum-processing means, as a detected signal, respectively. The detection means may be synchronous or nonsynchronous for converting each of the plurality of modulated-data signals to a detected signal.

Each of the detected signals is "integrated and dumped" by bit-synchronous means. The bit-synchronous means derives synchronization from a replica of the generic-chip-code signal produced by generic-spread-spectrum-processing means.

Switching means is coupled between an input of the demodulation means and each output of the message-spread-spectrum-processing means. The switching means also is coupled between the output of the demodulation means and a plurality of inputs of the combiner means. The switching means switches the demodulation means between each of the message-spread-spectrum-processing means and each input of the combiner means, respectively. A single demodulation means accordingly demodulates, by time sharing, each of the modulated-data signals as a respective demodulated signal, from each of the message-spread-spectrum-processing means. The combiner means, by time-sharing the demodulation means, combines each of the demodulated signals to generate the received-message data.

The present invention also includes a method for conference calling spread spectrum communications. The method comprises the steps of generating a generic-chip-code signal and a message-chip-code signal. The message data are modulo-2 added to the message-chip-code signal to generate a spread-spectrum-processed signal. The generic-chip-code signal and the spread-spectrum-processed signal are combined and transmitted on a carrier signal over the communications channel as a spread-spectrum-communications signal.

At the receiver, the steps include recovering the carrier signals from a plurality of received spread-spectrum-communications signals, and despreading the plurality of received spread-spectrum communications signal as a plurality of modulated-data signals. Each recovered-carrier signal is used to synchronize a step of generating a replica of the generic-chip-code signal at the transmitter.

A plurality of replicas of the message-chip-code signals is synchronized to the plurality of replicas of the generic-chip-code signals for despreading the plurality of received spread-spectrum-communications signals as a plurality of modulated-data signals, respectively. The plurality of modulated-data signals is detected as a plurality of detected signals, respectively. The recovered-carrier signal optionally may be used to synchronously demodulate the plurality of modulated-data signals as the plurality of detected signals. Each of the detected signals is synchronously converted to a demodulated signal, by using timing from the replica of the generic-chip-code signal to control "integrating and dumping" functions of a lowpass filter and electronic switch. The plurality of demodulated signals is combined to generate the received-message data.

Additional objects and advantages of the invention will be set forth in part in the description which follows, and in part will be obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

FIG. 4 shows a spread spectrum receiver with time multiplexing a data demodulator and decoder for conference call; and FIG. 5 is a flow chart of the method according to the present invention.

DETAILED DESCRIPTION OF THE PREFERRED EMBODIMENTS

Figure 1:
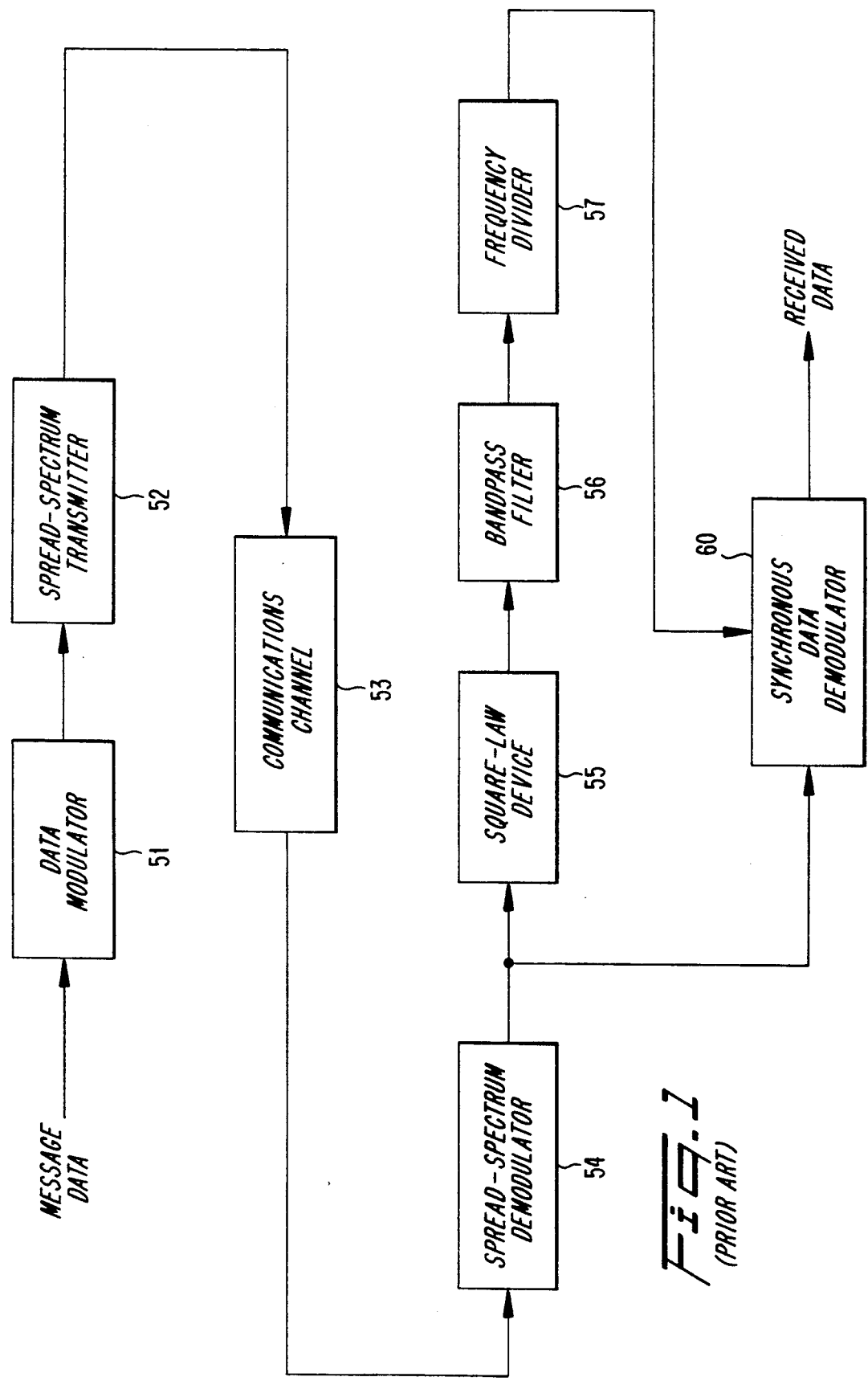
FIG. 1 is a prior art scheme for synchronously recovering message data.

Reference will now be made in detail to the present preferred embodiments of the invention, examples of which are illustrated in the accompanying drawings, wherein like reference numerals indicate like elements throughout the several views.

This patent is related to U.S. patent application Ser. No. 07/622,235, filing date Dec. 5, 1990, entitled SPREAD SPECTRUM CDMA COMMUNICATIONS SYSTEM by Donald L. Schilling, and to U.S. patent application Ser. No. 07/626,109, filing date Dec. 14, 1990, entitled SYNCHRONOUS SPREAD-SPECTRUM COMMUNICATIONS SYSTEM AND METHOD, which are both incorporated herein by reference.

The following disclosure first discusses a spread-spectrum transmitter, then the two embodiments of a spread-spectrum-conference-calling receiver. Broadly, this disclosure teaches apparatus and method for conference calling message data, from a plurality of spread-spectrum transmitters.

The spread-spectrum transmitter includes generic means, message means, summer means, and transmitting means. The generic means generates a generic-chip-code signal. The message means generates a message-chip-code signal. Message data and the message-chip-code signal are synchronized to the generic-chip-code signal. The spreading means spread-spectrum processes the message data with the message-chip-code signal to generate a spread-spectrum-processed signal.

The summer means combines the generic-chip-code signal with the spread-spectrum-processed signal. The combined signal typically is a multi-level signal, with the instantaneous-combined voltage level equal to the sum of the voltage levels of the message-chip-code signal and the generic-chip-code signal. A multi-level signal is defined as a signal with multiple voltage levels. The combined signal need not be an exact linear combination of the voltage levels, and the nonlinearity in the sum can be due to a nonlinear amplifier. The nonlinearity does not necessarily cause a significant degradation in performance, compared with a linear sum.

The transmitting means transmits the combined generic-chip-code signal and the spread-spectrum-processed signal, on a carrier signal over the communications channel as a spread-spectrum-communications signal.

Figure 2:
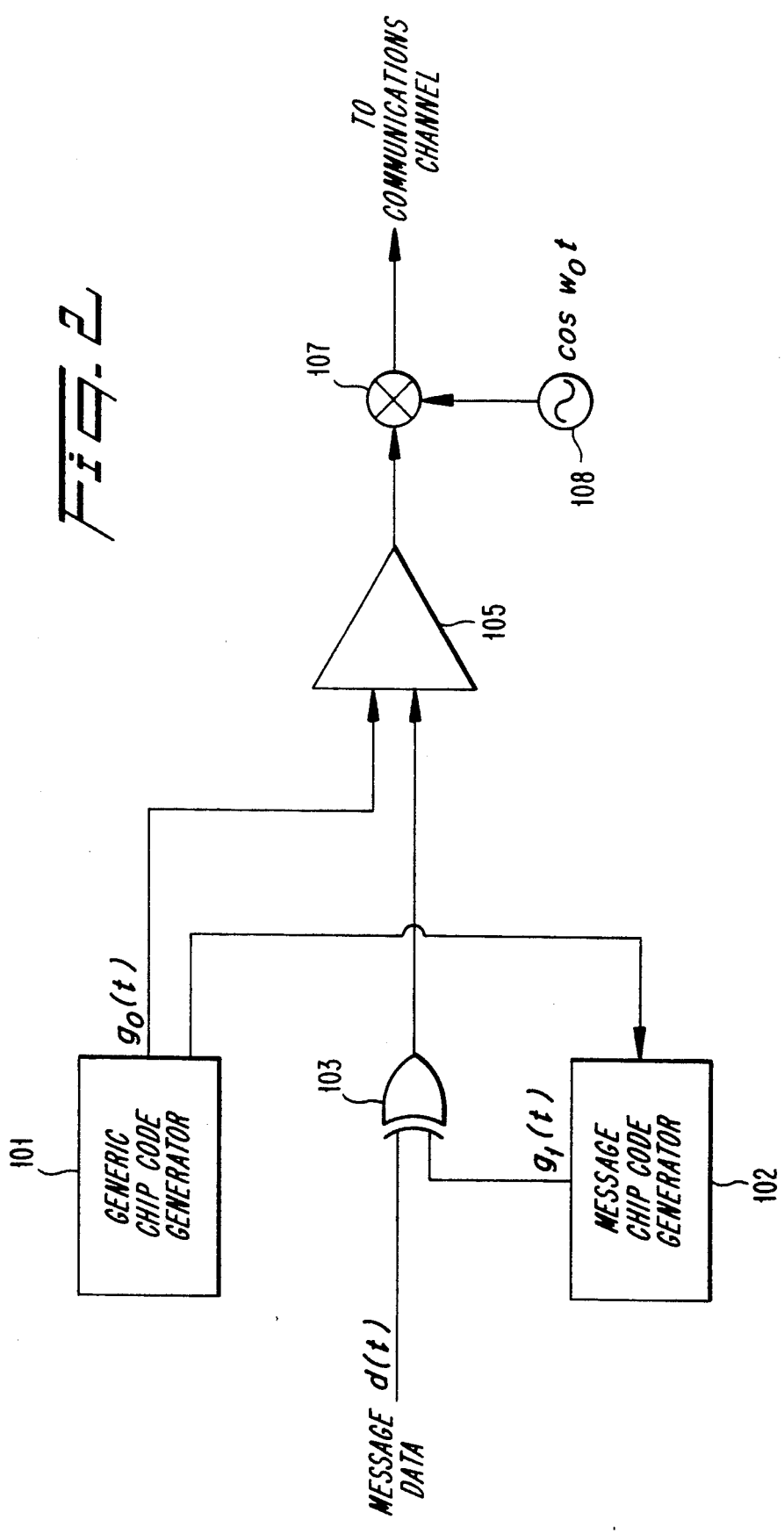
FIG. 2 shows a synchronous spread-spectrum transmitter.

Referring to FIG. 2, the message means may be embodied as a transmitter-message-chip-code generator 102, the spreading means may be embodied as an EXCLUSIVE-OR gate 103, and the generic means may be embodied as a generic-chip-code generator 101.

In FIG. 2, the transmitter-message-chip-code generator 102 generates a message-chip-code signal, $g_1(t)$. The generic-chip-code generator 101 generates a generic-chip-code signal, $g_0(t)$. The transmitter-generic chip-code generator 101 preferably is coupled to the transmitter-message-chip-code generator 102 for providing timing to the transmitter-message-chip-code generator 102. Synchronous timing of the message data, $d(t)$, and the plurality of message-chip code signals, is provided by the generic-chip-code signal, although other sources can be used, such as a common clock signal, for synchronization.

The EXCLUSIVE-OR gate 103 generates a spread-spectrum-processed signal by spread-spectrum processing message data, $d(t)$, with the message-chip-code signal, $g_1(t)$. The spread-spectrum processing may be accomplished by modulo-2 adding the message data, $d(t)$, with the message-chip-code signal, $g_1(t)$. The message-chip-code signal uses a chip codeword to spread-spectrum process the message data.

The combiner 105 combines the generic-chip-code signal and the spread-spectrum-processed signal, by adding the generic-chip-code signal with the spread-spectrum-processed signal. The combined signal typically is a multi-level signal, having the instantaneous voltage levels which are the sum of the voltage levels of the generic-chip-code signal and the spread-spectrum-processed signal.

The modulator 107, as part of the transmitter, modulates the combined generic-chip-code signal and the spread-spectrum-processed signal by a carrier signal, $\cos w_0 t$, at a carrier frequency, $f_0$. The modulated generic-chip-code signal and the spread-spectrum processed signal are transmitted over the communications channel as a spread-spectrum-communications signal, $x_c(t)$, at a single carrier frequency. The spread-spectrum-communications signal, $x_c(t)$, has the form:

$$x_c(t) = \{g_0(t) + [g_1(t) + d(t)]\} \cos w_0 t$$

Thus, the spread-spectrum-communications signal includes the generic-chip-code signal, i.e. a generic-chip codeword, and the spread-spectrum-processed signal as if they were each modulated separately, and synchronously, on separate carrier signals, with each carrier signal having the same carrier frequency, $f_0$. The spread-spectrum-communication signal is transmitted over the communications channel.

The present invention also provides a method for transmitting spread spectrum. The method includes the steps of generating a generic-chip-code signal; generating a message-chip-code signal and spread-spectrum processing the message data with the message-chip-code signal to generate a spread-spectrum-processed signal. The message data and the message-chip-code signal are synchronized to the generic-chip-code signal, or a common clock signal. The method also includes combining the generic-chip-code signal with the spread-spectrum-processed signal, and transmitting the combined generic-chip-code signal and the spread-spectrum-processed signal on a carrier signal over the communications channel as a spread-spectrum-communications signal.

The spread-spectrum-conference-calling receiver can be used for simultaneously receiving a plurality of spread-spectrum channels of a plurality of received spread-spectrum-communications signals. Each of the received spread-spectrum-communications signals has a spread-spectrum-communications signal. The plurality of received spread-spectrum-communication signals typically originate from a plurality of spread-spectrum transmitters, respectively. Thus, each of the spread-spectrum channels may originate from message data converted to a spread-spectrum-processed signal, from a spread-spectrum transmitter.

A first implementation of the spread-spectrum-conference-calling receiver includes a plurality of spread-spectrum receivers and combiner means. Each of the spread-spectrum receivers includes generic-spread-spectrum-processing means, acquisition and tracking means, message-spread-spectrum-processing means, and demodulation means.

In each of the spread-spectrum receivers the generic-spread-spectrum-processing means recovers a carrier signal from a generic-spread-spectrum channel of a received spread-spectrum-communications signal. The generic-spread-spectrum channel has the generic-chip-code signal which was combined with spread-spectrumprocessed signal at the respective spread-spectrum transmitter. The acquisition and tracking means synchronizes the generic-spread-spectrum-processing means to the recovered carrier signal.

Figure 3:
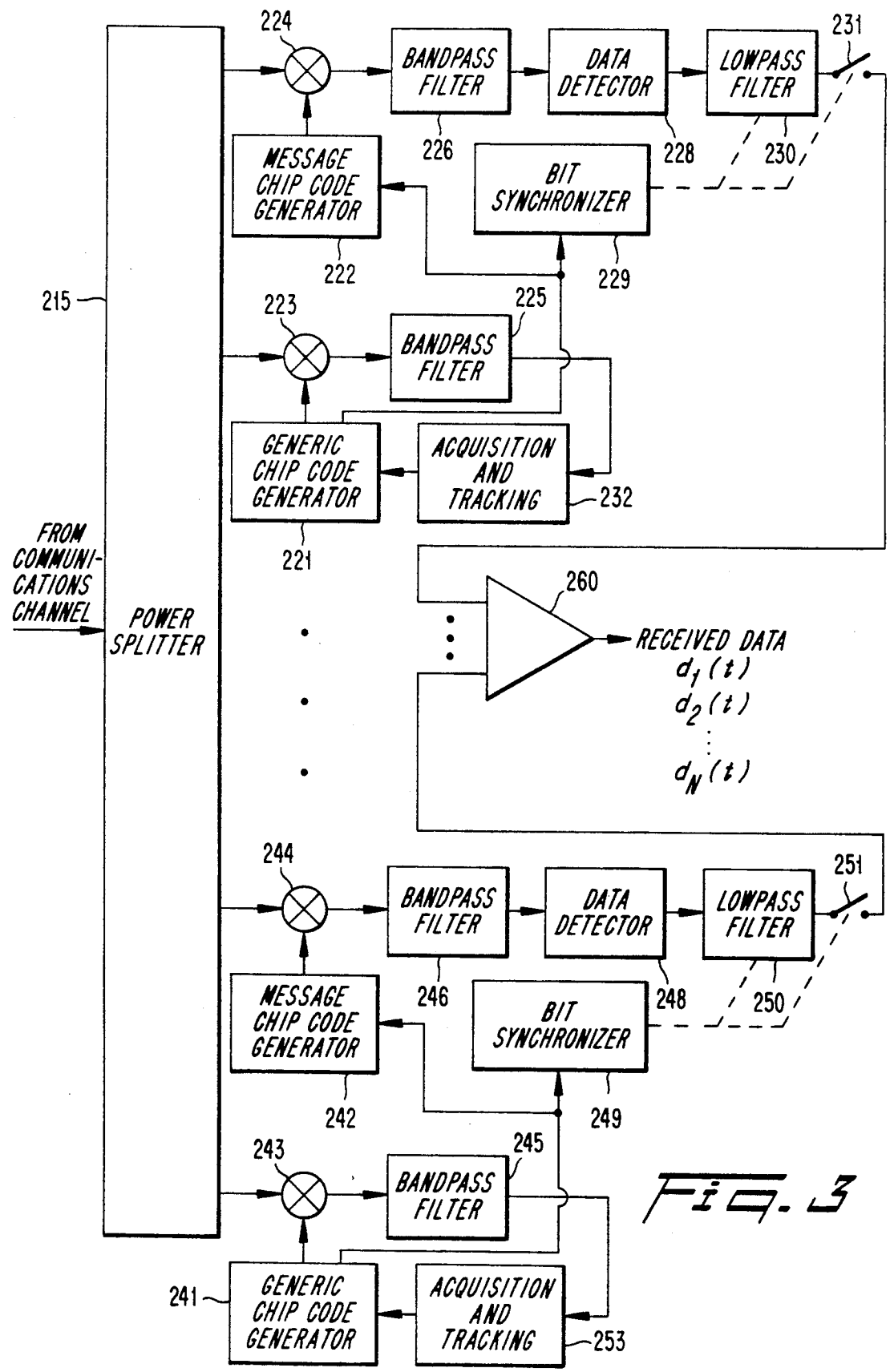
FIG. 3 shows a spread spectrum receiver for conference call.

As illustratively shown in FIG. 3, a first generic-spread-spectrum-processing means is embodied as a first receiver-generic-chip-code generator 221, a first generic mixer 223 and a first generic-bandpass filter 225, and a first acquisition and tracking means is embodied as a first acquisition and tracking circuit 232. An $N^1$ generic-spread-spectrum-processing means is embodied as an $N^1$ receiver-generic-chip-code generator 241, an $N^1$ generic mixer 243, and an $N^{th}$ generic-bandpass filter 245, and an $N^1$ acquisition and tracking means is embodied as an $N^1$ acquisition and tracking circuit 253. For each generic-spread-spectrum-processing means shown in FIG. 3, a generic mixer is coupled between a generic-bandpass filter and a receiver-generic-chip-code generator. Each acquisition and tracking circuit is coupled to an output of a generic-bandpass filter and to a generic-chip-code generator, respectively.

With the use of the invention as embodied in FIG. 3, a plurality of generic-spread-spectrum channels, as part of the spread-spectrum-communications signal, provides a plurality of recovered-carrier signals. Looking at the block diagram of the first spread-spectrum receiver of FIG. 3, a first acquisition and tracking circuit 232 acquires and tracks the recovered-carrier signal from an output of the generic-bandpass filter 225. The replica of the generic-chip-code signal from the receiver-generic-chip-code generator 221 is synchronized to the recovered-carrier signal via acquisition and tracking circuit 232. The receiver-generic-chip-code generator 221 generates a replica of the generic-chip-code signal, $g_0(t)$, which provides timing to bit synchronizer 229 and to the corresponding receiver-message-chip-code generator 222.

If the signal out of the generic-bandpass filter is small, then the acquisition and tracking circuit delays the phase of the generic-chip-code signal and the correlation process is repeated. If the phase of the replica of the generic-chip-code signal and the generic-chip-code signal in the spread-spectrum-communications signal are the same, then the output of the generic-bandpass filter will be at a high voltage level.

Each spread-spectrum receiver has message-spread-spectrum-processing means for despreading a spread-spectrum channel of one of the plurality of received spread-spectrum-communications signals, as a modulated-data signal. The message-spread-spectrum processing means derives synchronization from a replica of the generic-chip-code signal, or other synchronization signal, provided by the generic-spread-spectrum-processing means.

The first message-spread-spectrum-processing means of a first spread-spectrum receiver, as shown in FIG. 3, may be embodied as a first receiver message-chip-code generator 222, a first message mixer 224 and a first message-bandpass filter 226. The first message mixer 224 is connected between the first message-chip-code generator 222 and the first message-bandpass filter 226. The $N^1$ message-spread-spectrum-processing means is illustrated as the $N^1$ receiver-message-chip-code generator 242, the $N^1$ message mixer 244 and the $N^1$ message-bandpass filter 248. For each spread-spectrum receiver, a message mixer is coupled between a receiver-message-chip-code generator and a message-bandpass filter, respectively. The plurality of message mixers is coupled to the power splitter 215.

Each of the message-chip-code generators of a respective spread-spectrum receiver generates a replica of a message-chip-code signal, i.e. the chip codeword used to modulate the message data, for the spread-spectrum channel of the received spread-spectrum-communications signal being received from a respective spread-spectrum transmitter. Thus, a spread-spectrum receiver uses the same chip codeword as used at a respective spread-spectrum transmitter.

For each spread-spectrum receiver, a message mixer mixes a received spread-spectrum-communications signal with the replica of the message-chip-code signal to generate a modulated-data signal. The modulated-data signal is a modulated version of message data on a carrier signal, without spread-spectrum modulation. A message-bandpass filter filters the modulated-data signal.

Each spread-spectrum receiver has demodulation means for demodulating a modulated-data signal as a demodulated signal. The demodulation means includes detection means and bit-synchronous means. The detection means detects the modulated-data signal as a detected signal. The detection means may be synchronous or nonsynchronous, for converting a modulated-data signal to a detected signal. In the illustrative example of FIG. 3, the detection means is embodied as a data detector. More particularly, the first spread-spectrum receiver is shown with a first data detector 228, which is coupled to the first bandpass filter 226, and the $N^1$ spread-spectrum receiver is shown with an $N^1$ data detector 248, which is coupled to the $N^1$ bandpass filter 246. If a data detector uses synchronous detection, then a recovered-carrier signal from a respective generic-bandpass filter can serve as the reference signal for synchronously detecting the respective message-data signal as a detected signal. If the data detector uses nonsynchronous detection, as encountered with an envelope detector, then the recovered-carrier signal is not required. Each of the plurality of data detectors are coupled to one of the plurality message-bandpass filters, respectively.

The plurality of bit-synchronization means may be embodied as a plurality of bit synchronizers, a plurality of lowpass filters and a plurality of electronic switches, respectively. The plurality of bit synchronizers is shown as first bit synchronizer 229 through $N^1$ bit synchronizer 249. The plurality of lowpass filters is shown as first lowpass filter 230, through $N^1$ lowpass filter 250. The plurality of electronic switches is shown as first electronic switch 231, through $N^1$ electronic switch 251.

Each of the plurality of bit synchronizers is coupled to an output of the respective generic-bandpass filter. The recovered-carrier signal from the generic-bandpass filter also serves as the reference signal for synchronously demodulating each of the plurality of modulated-data signals by the plurality of synchronous detectors, as a plurality of demodulated signals, $d_1(t), d_2(t), \ldots, d_N(t)$.

Each of the bit synchronizers of the plurality of spread-spectrum receivers uses a replica of the generic-chip-code signal produced by the respective generic-chip-code generator. The generic-chip-code signal synchronizes the "integrating and dumping" of the detected signal. The "integrated and dumped" detected signal is referred to as a demodulated signal.

The plurality of bit synchronizers derive timing from the plurality of replicas of the generic-chip-code signals, and the timing of the integrating and dumping functions of the plurality lowpass filters and the plurality of electronic switches.

The combiner means is shown in FIG. 3 as a combiner 260. The outputs from each of the electronic switches is coupled to an input of a combiner 260. The combiner 260 combines the plurality of demodulated signals as received message data.

A second embodiment of the spread-spectrum-conference-calling receiver for simultaneously receiving a plurality of spread-spectrum channels includes a plurality of spread-spectrum receivers, demodulation means, combiner means and switching means. Each of the plurality of spread-spectrum receivers has generic-spread-spectrum-processing means, acquisition and tracking means and message-spread-spectrum-processing means. Each of the generic-spread-spectrum-processing means generates a replica of the generic-chip-code signal. The generic-spread-spectrum-processing means uses the replica of the generic-chip-code signal for recovering a carrier signal from a respective spread-spectrum channel of a received spread-spectrum-communications signal.

In FIG. 4, first generic-spread-spectrum-processing means, of a first spread-spectrum receiver, is embodied as a first receiver-generic-chip-code generator 221, a first generic mixer 223 and a first generic-bandpass filter 225, and a first acquisition and tracking means is embodied as a first acquisition and tracking circuit 232. An $N^{th}$ generic-spread-spectrum-processing means is embodied as an $N^{th}$ receiver-generic-chip-code generator 241, an $N^1$ generic mixer 243, and an $N^1$ generic-bandpass filter 245, and an $N^{th}$ acquisition and tracking means is embodied as an $N^{th}$ acquisition and tracking circuit 253. For each generic-spread-spectrum-processing means embodied in FIG. 3, a generic mixer is coupled between a generic-bandpass filter and a receiver-generic-chip-code generator. Each acquisition and tracking circuit is coupled to an output of a generic-bandpass filter, respectively.

As with the circuits shown in FIG. 3, the plurality of generic-spread-spectrum channels provides a plurality of recovered-carrier signals. Also, if the signal out of the generic-bandpass filter is small, then the acquisition and tracking circuit delays the phase of the generic-chip-code signal and the correlation process is repeated. If the phase of the replica of the generic-chip-code signal and the generic-chip-code signal in the spread-spectrum-communications signal are the same, then the output of the generic-bandpass filter will be at a high voltage level.

The message-spread-spectrum-processing means of each spread-spectrum receiver despreads the respective spread-spectrum channel of the plurality of received spread-spectrum-communications signals as a modulated-data signal. Each message-spread-spectrum-processing means derives synchronization from a replica of the generic-chip-code signal, or other synchronization signal, provided by the generic-spread-spectrum-processing means.

The first message-spread-spectrum-processing means, as shown in FIG. 4, may be embodied as a first receiver-message-chip-code generator 222, a first message mixer 224 and a first message-bandpass filter 226. The first message mixer 224 is connected between the first message-chip-code generator 222 and the first message-bandpass filter 226. The $N^{th}$ message-spread-spectrum-processing means is illustrated as the $N^1$ receiver-message-chip-code generator 242, the $N^1$ message mixer 244, and the $N^1$ message-bandpass filter 248. For each spread-spectrum receiver, a message mixer is connected between a receiver-message-chip-code generator and a message-bandpass filter, respectively. The plurality of message mixers of the plurality of spread-spectrum receivers is connected to the power splitter 215.

The plurality of message mixers generate replicas of the plurality of message-chip-code signals, $g_1(t)$, $g_2(t)$, . . . , $g_n(t)$, which were used by the plurality of spread-spectrum transmitters, respectively. The plurality of message mixers mix the received spread-spectrum-communications signal with the replicas of the plurality of message-chip-code signals to generate the plurality of modulated-data signals, respectively. The plurality of message-bandpass filters filter the plurality of modulated-data signals, respectively.

A single demodulating means is employed for demodulating each modulated-data signal, from a message-bandpass filter, as a respective demodulated signal. Switching means is coupled between an input of the demodulation means and each output of each of the message-spread-spectrum-processing means. The switching means also is coupled between the output of the demodulation means and a plurality of inputs of the combiner means. The switching means switches the demodulation means between each of the message-spread-spectrum-processing means and each input of the combiner means, respectively. A single demodulation means accordingly demodulates, by time sharing, each of the modulated-data signals as a respective demodulated signal, from each of the message-spread-spectrum-processing means. The combiner means, by time-sharing the demodulation means, combines each of the demodulated signals from the demodulation means. If required, the switching means also switches the demodulation means between each of the generic-spread-spectrum-processing means, for appropriate timing and synchronization.

The demodulation means includes detection means and bit-synchronization means. In FIG. 4, the detection means is embodied as a data demodulator 338. The data demodulator 338 may be a nonsynchronous detector such as an envelope detector or square-law detector. Alternatively, the data demodulator 338 may be a synchronous detector, which uses a recovered-carrier signal which is switched from each of the generic-bandpass filters. The bit-synchronization means includes a lowpass filter and an electronic switch, and a bit synchronizer. The lowpass filter and electronic switch are coupled to the bit synchronizer, similar to the first bit-synchronization means shown in FIG. 3. The bit synchronizer preferably is coupled through an input electronic switch, to the plurality of receiver-generic-chip-code generators of the plurality of spread-spectrum receivers. Alternatively, the bit synchronizer may be coupled to an output of the data detector.

The switching means is shown as input-electronic switch 330 and output-electronic switch 350. The input-electronic switch 330 and the output-electronic switch 350 are synchronized to switch the data demodulator 338 between respective message-bandpass filters and inputs to the combiner 225. Synchronization of the input-electronic switch 330 and the output-electronic switch 350 can be provided through a command channel of the received spread-spectrum communications signal, or self-synchronized between respective channels from the spread-spectrum receivers. Appropriate buffers are included for this synchronization.

The combiner means, by time-sharing the demodulation means, combines each of the demodulated signals from the demodulation means to generate the received-message data. In FIG. 4, the combiner means is embodied as a combiner 225.

In use, a plurality of spread-spectrum transmitters, each similar to the one in FIG. 2, transmits a plurality of message data, $d_1(t), d_2(t), \ldots, d_N(t)$. For the first transmitter, as an example, the transmitter-generic-chip-code generator 101 generates a first generic-chip-code signal, $g_0(t)$, and the transmitter-message-chip-code generator 102 generates a first message-chip-code signal $g_1(t)$. Synchronous timing of the message-chip-code signals is provided by the generic-chip-code signal, although other sources can be used such as a common clock signal for synchronization. The EXCLUSIVE-OR device 103 generates a spread-spectrum signal by spread-spectrum processing the data signal with the message-chip-code signal. The spread-spectrum processing may be accomplished by modulo-2 adding the demultiplexed-data signal to the message-chip-code signal. The combiner 105 combines the generic-chip-code signal with the spread-spectrum-processed signal. The combined generic-chip-code signal and spread-spectrum-processed signal may be a multilevel signal, having the instantaneous voltage levels of the generic-chip-code signal and the spread-spectrum-processed signal.

The modulator 107, as part of the transmitter, modulates the combined generic-chip-code signal and the plurality of spread-spectrum-processed signals by a carrier signal, $\cos w_o t$, at a carrier frequency, $f_o$. The modulated generic-chip-code signal and spread-spectrum processed signal are transmitted over the communications channel 110 as a first spread-spectrum-communications signal, $x_c(t)$. Thus, the spread-spectrum-communications signal includes the generic-chip-code signal and the spread-spectrum-processed signal as if they were each modulated separately, and synchronously, on separate carrier signals having the same carrier frequency, $f_o$, and transmitted over the communications channel.

With the use of the invention as embodied in FIGS. 3 and 4, a generic-spread-spectrum channel, as part of each received spread-spectrum-communications signal, provides a recovered-carrier signal. For each spread-spectrum receiver, and as illustrated with the first spread-spectrum receiver, the acquisition and tracking circuit 232 acquires and tracks the recovered-carrier signal from an output of the generic-bandpass filter 225. For the first spread-spectrum receiver, by way of example, the replica of the first generic-chip-code signal from the first receiver-generic-chip-code generator 221 is synchronized to the first recovered-carrier signal via first acquisition and tracking circuit 232. The first receiver-generic-chip-code generator 221 generates a replica of the first generic-chip-code signal, $g_0(t)$, which provides timing to first bit synchronizer 229 and to the first receiver-message-chip-code generator 222.

The first receiver-generic-chip-code generator 221 generates a replica of the first generic-chip-code signal, $g_0(t)$. The first generic mixer 223 uses the replica of the first generic-chip-code signal for despreading the spread-spectrum-communications signal, $x_c(t)$, from the power splitter 115, as a first recovered-carrier signal. The spread-spectrum channel, of the received spread-spectrum-communications signal having the first generic chip-code signal, $g_0(t)\cos w_o t$, generally does not include data so that despreading the received spread-spectrum-communications signal produces the carrier signal, only. The first generic-bandpass filter 225 filters the first recovered-carrier signal at the carrier frequency, or equivalently, at an intermediate frequency (IF). In comparison to a message-bandpass filter which has a bandwidth sufficiently wide for filtering a modulated-data signal, the first generic-bandpass filter 225 can have a very narrow bandwidth for filtering the recovered carrier signal. The very narrow bandwidth of the first generic-bandpass filter 225 assists in extracting the recovered carrier signal from noise.

The first recovered-carrier signal is used to synchronize the step of generating a replica of the first generic chip-code signal. More particularly, a replica of the first generic-chip-code signal is correlated with the received spread-spectrum-communications signal, which has a generic channel defined by the first generic-chip-code signal at a first spread-spectrum transmitter. If the signal out of the first generic-bandpass filter 225 is small, then the acquisition and tracking circuit 232 delays the phase of the replica of the generic-chip-code signal and the correlation process is repeated. If the phases of the replica of the generic-chip-code signal and the generic-chip-code signal in the received spread-spectrum-communications signal are the same, then the output of the first generic-bandpass filter 225 is at a high voltage level.

The first acquisition and tracking circuit 232 acquires and tracks the recovered-carrier signal from an output of the first generic-bandpass filter 225. The replica of the first generic-chip-code signal from the first receiver-generic-chip-code generator 221 is synchronized to the recovered-carrier signal via first acquisition and tracking circuit 232.

The first receiver-message-chip-code generator 222 generates a replica of the first message-chip-code signal, $g_1(t)$. The replica of the first message-chip-code signal, $g_1(t)$, is synchronized to the replica of the first generic-chip-code signal, $g_0(t)$, from the first receiver-generic-chip-code generator 221. Thus, the first receiver-message-chip-code generator 222, via synchronization to the first receiver-generic-chip-code generator 221, has the same synchronization as the transmitter-message-chip-code generator 102 via synchronization to the transmitter-generic-chip-code generator 101. Accordingly, the spread-spectrum communications channel having the generic-chip-code signal provides coherent spread-spectrum demodulation, i.e. coherent bit synchronization, of the spread-spectrum channels with data.

The first message mixer 224 uses the replica of the message-chip-code signal $g_1(t)$, for despreading the received spread-spectrum-communications signal, from the power splitter 115, to generate a first modulated-data signal, $d_{R1}(t)\cos w_o t$. The modulated-data signal effectively is the first message-data signal modulated by the carrier signal. The message-bandpass filter 126 filters the first modulated-data signal at the carrier frequency, or equivalently at an intermediate frequency (IF). Down converters, which convert the modulated-data signal to an IF, optionally may be used without altering the cooperative functions or teachings of the present invention.

More generally, the plurality of message mixers generate replicas of the plurality of message-chip-code signals, $g_1(t), g_2(t), \ldots, g_n(t)$, respectively. The plurality of message mixers mix the plurality of received spread-spectrum-communications signal with the replicas of the plurality of message-chip-code signals to generate the plurality of modulated-data-signals, respectively. The plurality of message-bandpass filters filter the plurality of modulated-data signals, respectively.

Referring to FIG. 3, the first date detector 228 demodulates the modulated-data signal as a detected signal. The detected signal is filtered through first lowpass filter 228, sampled by electronic switch 231 and outputted as a first demodulated signal, $d_{R1}(t)$ The demodulated signal, without errors, is identical to the first message-data signal. The first lowpass filter 230 and first electronic switch 231 operate in an "integrate and dump" function, respectively, under the control of the first bit synchronizer 229.

The first bit synchronizer 229 controls the integrating and dumping of first lowpass filter 230 and first electronic switch 231. The first bit synchronizer 229 preferably derives synchronization using the replica of the first generic-chip-code signal, or other synchronization signal, from the first receiver-generic-chip-code generator 221 as illustrated in FIG. 3. The first bit synchronizer also may derive synchronization from an output of the first date detector 228, as illustrated in FIG. 3, when a generic-chip-code signal is not used.

In a preferred embodiment, the first bit synchronizer 229 receives the replica of the first generic-chip-code signal, $g_0(t)$, from the first receiver-generic-chip-code generator 221. The replica of the first generic-chip-code signal, by way of example, may include a chip codeword having 8250 chips. Assuming that there are eleven bits per chip codeword, then there are 750 chips per bit of data. Since the replica of the generic-chip-code signal provides information to the bit synchronizer 129 as to where the chip codeword begins, the first bit synchronizer 229 thereby knows the timing of the corresponding bits for synchronization.

In FIG. 4, demodulation of each modulated data signal from the plurality of spread-spectrum receivers is performed using data demodulator 338, similar to the data demodulation of FIG. 3, as a time share. The CVSD decoder 340 can be used at the output of the data demodulator 338.

The plurality of demodulated signals of FIGS. 3 and 4 are combined by combiner 225 to generate the received-message data. The received-message data are the message data originally transmitted by the plurality of spread-spectrum transmitters.

The present invention also includes a method for synchronously demodulating a spread-spectrum-communications signal. Message data are input to the spreading means. Referring to FIG. 5, for each spread-spectrum transmitter, the method comprises the steps of generating 403 a generic-chip-code signal. The method further includes generating 405 message data and generating 407 a message-chip-code signal synchronized to the generic-chip-code signal, or other clock signal. Message data are processed 408, using a spread-spectrum modulator, with the message-chip-code signal to generate a spread-spectrum-processed signal. The generic-chip-code signal is combined 409 with the spread-spectrum-processed signal. The method transmits 411 the combined generic-chip-code signal and spread-spectrum-processed signal on a carrier signal over the communications channel as a spread-spectrum-communications signal.

The present invention further includes a method for receiving spread-spectrum conference calls. The receiving method uses a replica of each generic-chip-code signal used by each spread-spectrum transmitter for recovering 413 a carrier signal from each spread-spectrum-communications signal, and acquiring and tracking the recovered-carrier signal. The replica of the generic-chip-code signal is synchronized to the recovered-carrier signal. The method includes generating a replica of the message-chip-code signal synchronized to the replica of the generic-chip-code signal. The replica of the message-chip-code signal is used to despread 415 one of the plurality of the received spread-spectrum-communications signals as a modulated-data signal. The modulated-data signal is demodulated 417 as received data.

The receiving method also may have the demodulating step include synchronously demodulating 415, using the recovered-carrier signal, the modulated-data signal as a detected signal, or nonsynchronously demodulating, using an envelope detector, the modulated-data signal to the demodulated signal. A plurality of demodulated data signals are combined 419 as received-message data.

In use, each of the plurality of spread-spectrum transmitters has a transmitter-generic-chip-code generator generating a generic-chip-code signal. Message data at each spread-spectrum transmitter are spread-spectrum processed by an EXCLUSIVE-OR gate with a message-chip-code signal from the transmitter-message-chip-code generator. The combiner combines the generic-chip-code signal with the spread-spectrum-processed signal. The combined signal may be, for example, a multi-level signal, which is generated by adding the voltage levels of the generic-chip-code signal and the spread-spectrum-processed signal. The transmitter transmits on a carrier signal having a carrier frequency, $f_o$, the combined generic-chip-code signal and the spread-spectrum-processed signal. The spread-spectrum-communications signal is transmitted through the communications channel.

A plurality of received spread-spectrum-communications signals therefore, are transmitted from a plurality of spread-spectrum transmitters, respectively.

At the receiver, consider operations of the first spread spectrum receiver. The first generic-spread-spectrum-processing means, embodied as the first receiver-generic-chip-code generator 221, the first generic mixer 223 and the first generic-bandpass filter 225, cooperatively operate to recover one of the carrier signals from the received plurality of spread-spectrum-communications signals. The first message-spread-spectrum-processing means, embodied as the first receiver-message-chip-code generator 222, the first message mixer 224 and the first message-bandpass filter 226, cooperatively despread the spread-spectrum-communications signal as the modulated-data signal. The first receiver-message-chip-code generator 222 preferably is synchronized to the replica of the generic-chip-code signal or other clock signal from the receiver-generic-chip-code generator 121. The first demodulation means, embodied as the first data detector 228, demodulates the modulated-data signal as received data.

The received data are integrated and dumped by lowpass filter 236 and electronic switch 231, under control of the bit synchronizer 229. The bit synchronizer 229 preferably uses the replica of the generic-chipcode signal for synchronizing the integrate and dump functions.

The combiner combines the plurality of received data from the plurality of spread-spectrum receivers, as the output message data.

It will be apparent to those skilled in the art that various modifications can be made to the spread spectrum conference calling system and method of the instant invention without departing from the scope or spirit of the invention, and it is intended that the present invention cover modifications and variations of the spread spectrum conference calling system and method provided they come in the scope of the appended claims and their equivalents.

I claim:

1. A spread-spectrum-conference-calling receiver for simultaneously listening to a plurality of spread-spectrum channels of a plurality of received spread-spectrum-communications signals comprising:
   combiner means;
   a plurality of spread-spectrum receivers, each of said spread-spectrum receivers including,
      generic-spread-spectrum-processing means for generating a replica of a generic-chip-code signal for recovering a carrier signal for a respective spread-spectrum channel, from the plurality of received spread-spectrum-communications signals;
      acquisition and tracking means responsive to acquiring and tracking the recovered carrier signal for synchronizing said generic-spread-spectrum-processing means to the recovered carrier signal;
      message-spread-spectrum-processing means for despreading the spread-spectrum-communications signal as a modulated-data signal; and
      demodulation means for demodulating the modulated-data signal as a demodulated signal; and
   wherein said combiner means combines each of the plurality of demodulated signals from said plurality of spread-spectrum receivers.

2. The spread-spectrum-conference-calling receiver as set forth in claim 1 wherein:
   each of said generic-spread-spectrum-processing means includes a generic mixer for recovering the carrier signal for the respective spread-spectrum channel, from the plurality of received spread-spectrum-communications signals;
   each of said message-spread-spectrum-processing means includes a message mixer for despreading the respective spread-spectrum channel from the plurality of received spread-spectrum-communications signals, as the modulated-data signal; and
   each of said demodulation means includes an envelope detector for detecting the respective modulated-data signal as the respective demodulated signal.

3. The spread-spectrum conference-calling receiver as set forth in claim I wherein:
   each of said generic-spread-spectrum-processing means includes a generic mixer for recovering the carrier signal for the respective spread-spectrum channel, from the plurality of received spread-spectrum-communications signals;
   each of said message-spread-spectrum-processing means includes a message mixer for despreading the respective spread-spectrum channel from the plurality of received spread-spectrum-communications signals, as the modulated-data signal; and
   said demodulation means includes a synchronous detector responsive to the recovered-carrier signal for converting the respective modulated-data signal to the respective demodulated signal.

4. A spread-spectrum-conference-calling receiver for simultaneously listening to a plurality of spread-spectrum channels of a plurality of received spread-spectrum-communications signals comprising:
   a plurality of spread-spectrum receivers, each of said spread-spectrum receivers including generic-spread-spectrum-processing means for generating a replica of a generic-chip-code signal for recovering a carrier signal for a respective spread-spectrum channel from the plurality of received spread-spectrum-communications signals, acquisition and tracking means responsive to acquiring and tracking the recovered carrier signal for synchronizing said generic-spread-spectrum-processing means to the recovered carrier signal, and message-spread-spectrum-processing means for despreading a respective spread-spectrum channel of the plurality of received spread-spectrum-communications signals as a modulated-data signal;
   demodulation means for demodulating the modulated-data signal as a demodulated signal;
   combiner means having a plurality of inputs for combining a plurality of demodulated signals; and
   switching means coupled between an input of said demodulation means and each of said message-spread-spectrum-processing means and between an output of said demodulation means and the plurality of inputs of said combiner means, for switching said demodulation means between each of said message-spread-spectrum-processing means and each input of said combiner means, respectively.

5. The spread-spectrum-conference-calling receiver as set forth in claim 4 wherein:
   each of said generic-spread-spectrum processing means includes a generic mixer for recovering the carrier signal for the respective spread-spectrum channel, from the plurality of received spread-spectrum-communications signals;
   each of said message-spread-spectrum-processing means includes a message mixer for despreading the respective spread-spectrum channel from the plurality of received spread-spectrum-communications signals, as the modulated-data signal; and
   said demodulation means includes an envelope detector for detecting the respective modulated-data signal as the respective demodulated signal.

6. The spread-spectrum-conference-calling receiver as set forth in claim 4 wherein:
   each of said generic-spread-spectrum-processing means includes a generic mixer for recovering the carrier signal for the respective spread-spectrum channel, from the plurality of received spread-spectrum-communications signals;
   each of said message-spread-spectrum-processing means includes a message mixer for despreading the respective spread-spectrum channel from the plurality of received spread-spectrum-communications signals, as the modulated-data signal; and
   said demodulation means includes a synchronous detector responsive to the recovered-carrier signal for converting the respective modulated-data signal to the respective demodulated signal.

7. A spread-spectrum-conference-calling receiver for simultaneously listening to a plurality of spread-spectrum channels of a plurality of received spread-spectrum-communications signals comprising:
a combiner;
a plurality of spread-spectrum receivers, each of said spread-spectrum receivers including,
a receiver generic-chip-code generator for generating a replica of a generic-chip-code signal;
a generic mixer coupled to said generic-chip-code generator and responsive to the replica of the generic-chip-code signal for recovering a carrier signal from a respective spread-spectrum channel, from the plurality of received spread-spectrum-communications signals;
an acquisition and tracking circuit coupled to said generic mixer and responsive to acquiring and tracking the recovered carrier signal, for synchronizing said generic-chip-code generator to the recovered carrier signal;
a receiver-message-chip-code generator for generating a message-chip-code signal;
a message mixer coupled to said message-chip-code generator and responsive to the message-chip-code signal for despreading a respective spread-spectrum channel of the plurality of received spread-spectrum-communications signals as a modulated-data signal;
demodulation means for demodulating the modulated-data signal as a demodulated signal; and
wherein said combiner combines each of the plurality of demodulated signals from said plurality of spread-spectrum receivers.

8. The spread-spectrum-conference-calling receiver as set forth in claim 7 wherein each of said demodulation means includes an envelope detector for detecting the respective modulated-data signal as the respective demodulated signal.

9. The spread-spectrum-conference-calling receiver as set forth in claim 7 wherein demodulation means includes a synchronous detector responsive to the recovered-carrier signal for converting the respective modulated-data signal to the respective demodulated signal.

10. A spread-spectrum-conference-calling receiver for simultaneously listening to a plurality of spread-spectrum channels of a plurality of received spread-spectrum-communications signals comprising:
a plurality of spread-spectrum receivers, each of said spread-spectrum receivers including,
a receiver-generic-chip-code generator for generating a replica of a generic-chip-code signal;
a generic mixer coupled to said generic-chip-code generator and responsive to the generic-chip-code signal for recovering a carrier signal for a respective spread-spectrum channel from the spread-spectrum-communications signal;
an acquisition and tracking circuit responsive to acquiring and tracking the recovered carrier signal for synchronizing said generic-chip-code generator means to the recovered carrier signal; and
a receiver-message-chip-code generator for generating a message-chip-code signal;
a message mixer coupled to said message-chip-code generator and responsive to the message-chip-code signal for despreading the spread-spectrum-communications signal as a modulated-data signal;
demodulation means for demodulating the modulated-data signal as a demodulated signal;
a receiver-combiner having a plurality of inputs for combining a plurality of the demodulated signals; and
a switching circuit coupled between an input of said demodulation means and each of said message mixers of said plurality of spread-spectrum receivers, and between an output of said demodulation means and the plurality of inputs of said combiner, for switching said demodulation means between each of said message mixers and each input of said combiner, respectively.

11. The spread-spectrum-conference-calling receiver as set forth in claim 10 wherein said demodulation means includes an envelope detector for detecting the respective modulated-data signal as the respective demodulated signal.

12. The spread-spectrum-conference-calling receiver as set forth in claim 10 wherein said demodulation means includes a synchronous detector responsive to the recovered-carrier signal for converting the respective modulated-data signal to the respective demodulated signal.

13. A method for simultaneously listening to a plurality of spread-spectrum channels of a plurality of received spread-spectrum communications signals, comprising the steps for each spread-spectrum channel of:
generating a replica of a generic-chip-code signal for a respective spread-spectrum channel;
recovering, using the replica of the respective generic-chip-code signal, a respective carrier signal from the plurality of received spread-spectrum-communications signals;
acquiring and tracking the recovered-carrier signal and synchronizing the replica of the generic-chip-code signal to the recovered-carrier signal;
generating a replica of the message-chip-code signal synchronized to the replica of the generic-chip-code signal;
despreading, using the replica of the message-chip-code signal, the spread-spectrum channel of the spread-spectrum-communications signal as a modulated-data signal; and
demodulating the modulated-data signal as a demodulated signal.

14. The method as set forth in claim 13 wherein the demodulating step includes synchronously demodulating, using the recovered-carrier signal, the respective modulated-data signal as a respective demodulated signal.

15. The spread spectrum communications system as set forth in claim 13 wherein the demodulating step includes demodulating, using an envelope detector, the respective modulated-data signal as the respective demodulated signal.

* * * * *